July 11, 1950 — L. A. MARIHART — 2,514,405
PHOTOELECTRIC UNIT FOR AGRICULTURAL OPERATION
Filed May 14, 1948 — 4 Sheets-Sheet 3
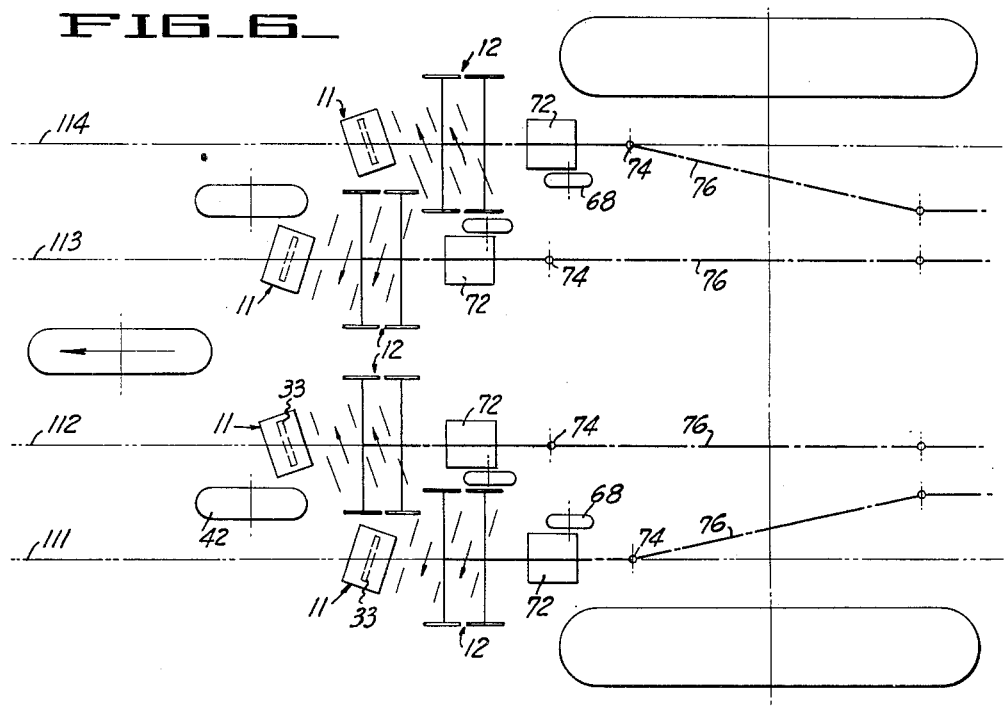
FIG_6_
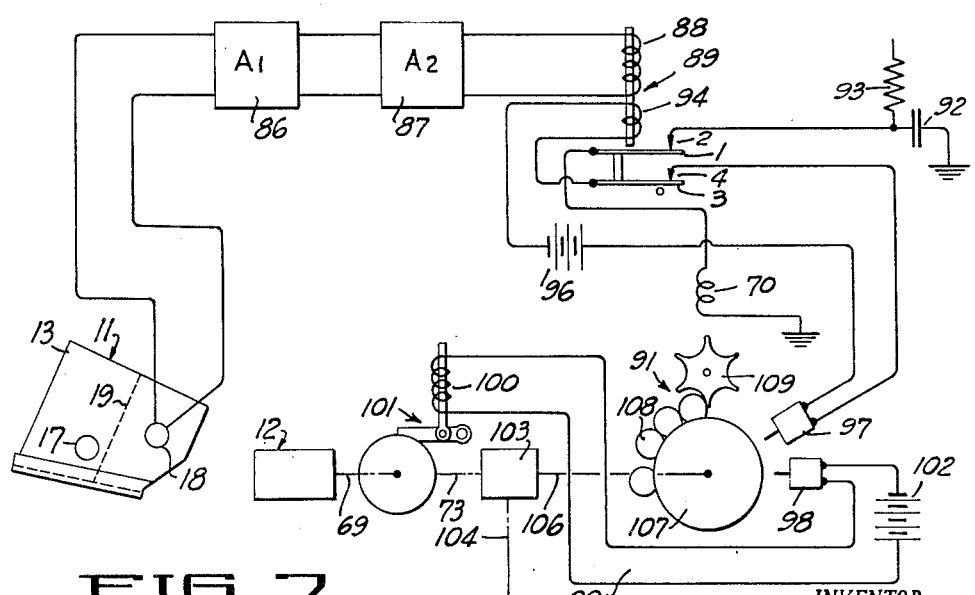
FIG_7_
INVENTOR.
Leo A. Marihart
BY Flehr & Swain
ATTORNEYS July 11, 1950            L. A. MARIHART            2,514,405
PHOTOELECTRIC UNIT FOR AGRICULTURAL OPERATION
Filed May 14, 1948            4 Sheets-Sheet 4
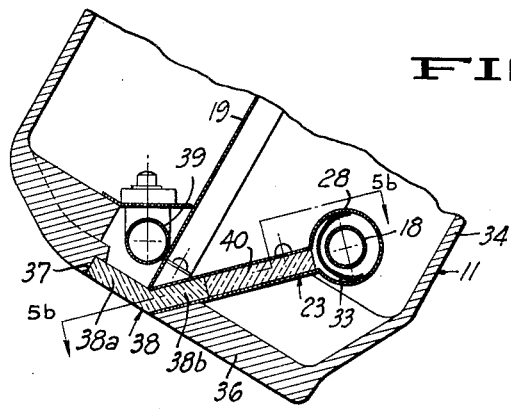
FIG_5A_
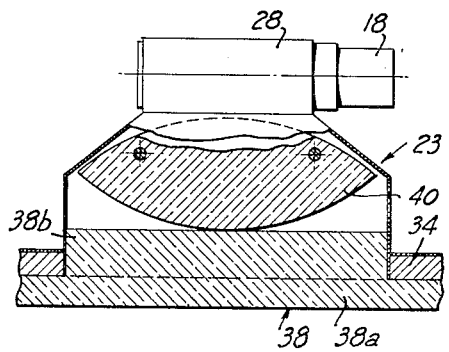
FIG_5B_
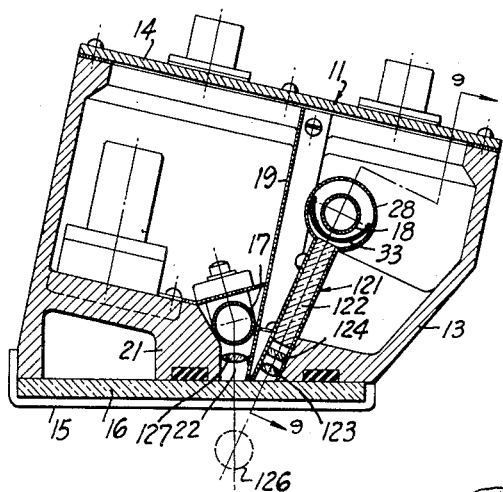
FIG_8_
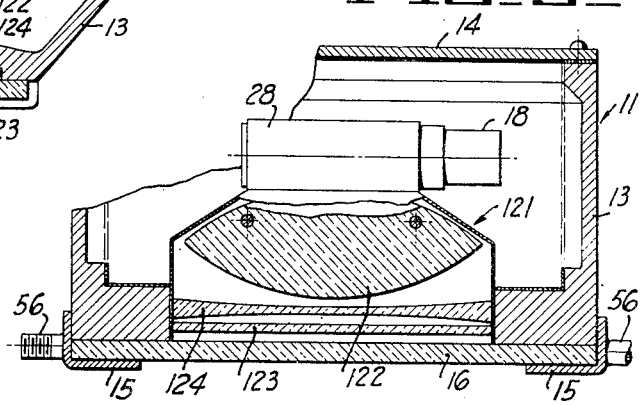
FIG_9_
INVENTOR.
Leo A. Marihart
BY *Flehr & Swain*
ATTORNEYS Patented July 11, 1950

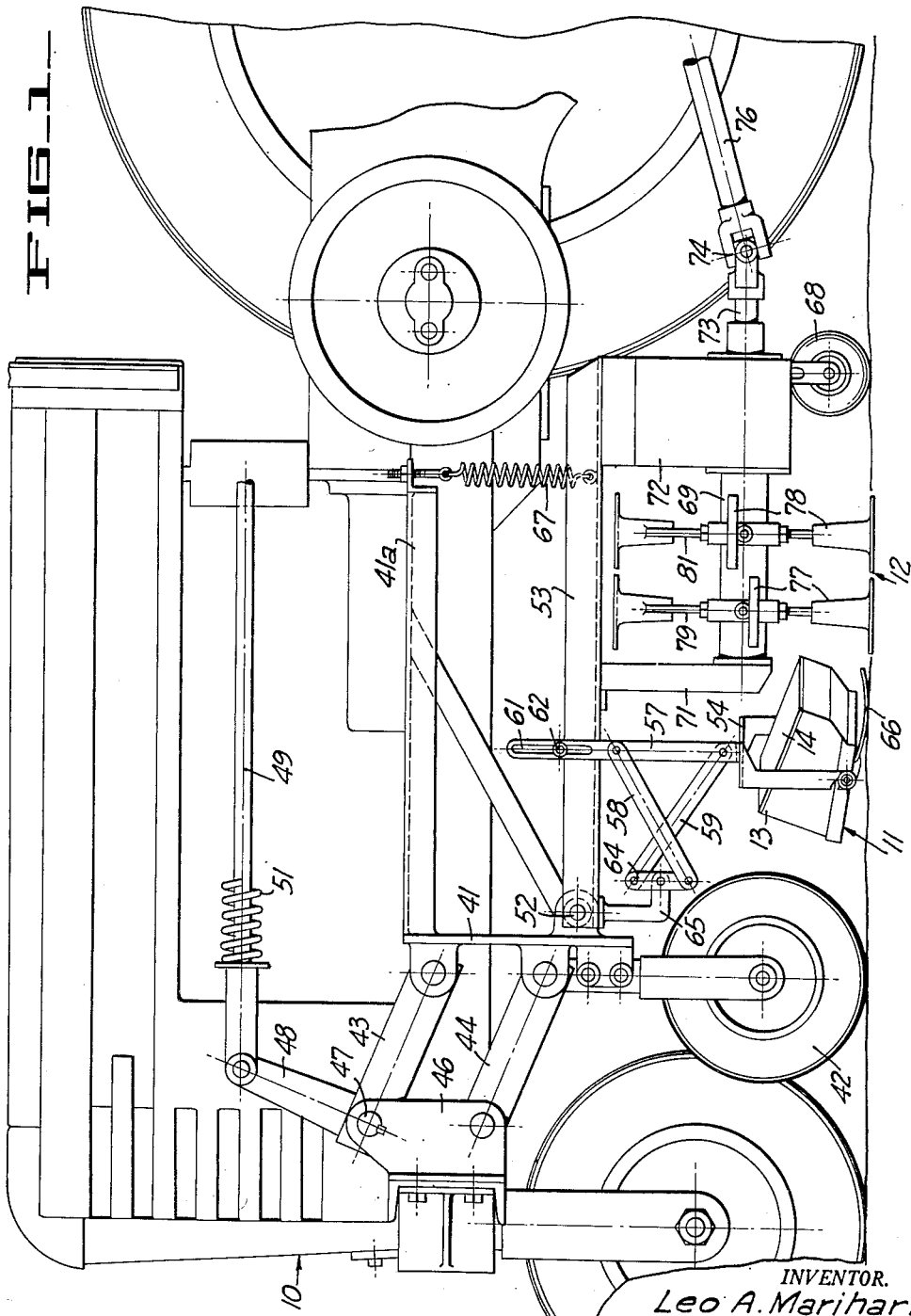

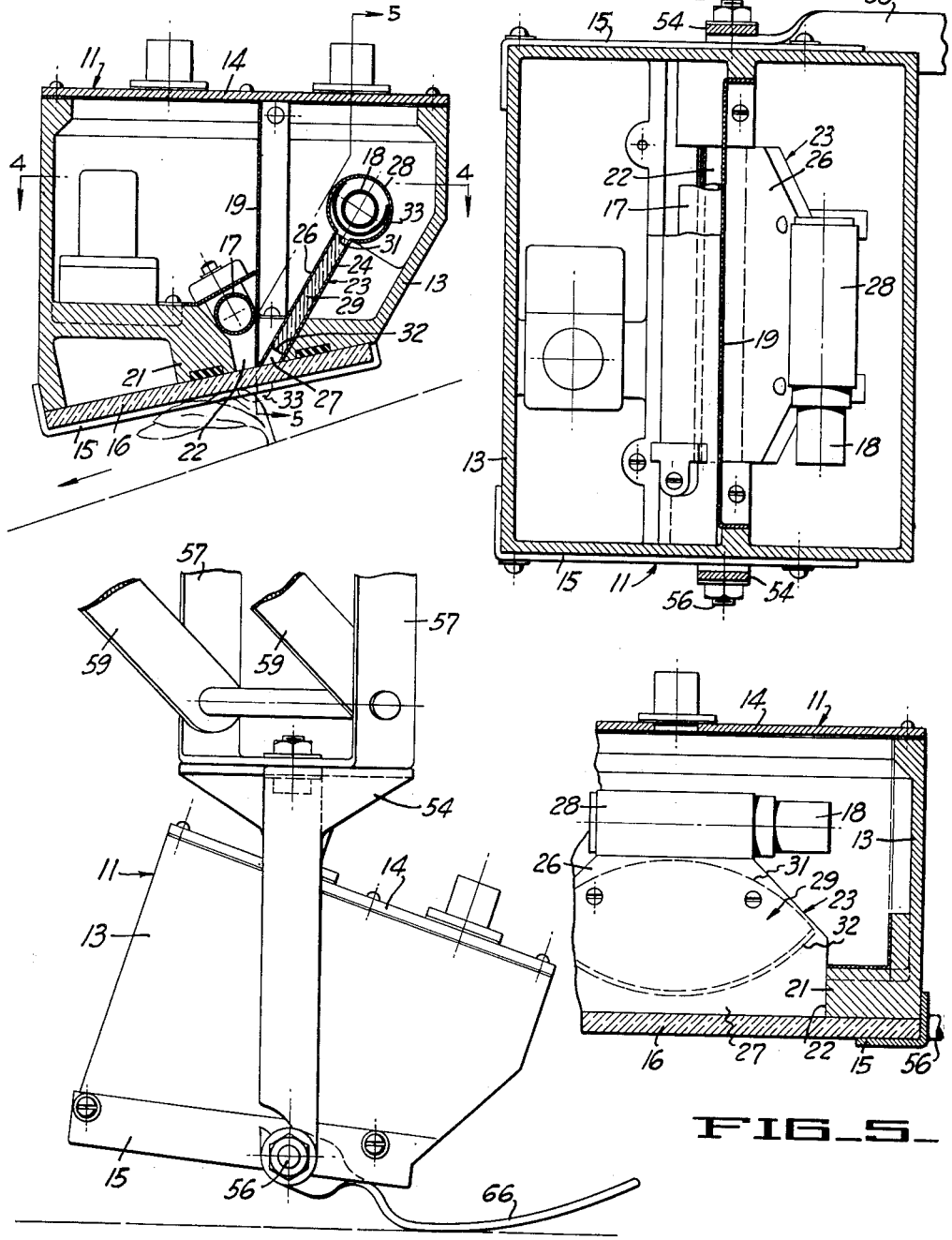

2,514,405

UNITED STATES PATENT OFFICE 2,514,405

PHOTOELECTRIC UNIT FOR AGRICULTURAL OPERATIONS

Leo A. Marihart, Monterey, Calif., assignor to M. P. H. Industries, Palo Alto, Calif., a corporation of California Application May 14, 1948, Serial No. 27,089

4 Claims. (Cl. 250—239)

This invention relates generally to photoelectric units suitable for controlling certain agricultural operations. Such units can be used to advantage for various purposes, including its use in thinning or hoeing machines of the type disclosed in my Patent No. 2,400,562, and in machines for selective treatment of plants.

In controlling agricultural operations upon individual plants it has been proposed to provide a photoelectric unit which is moved along the plant row, and which secures light responses to indicate the location of plants. The light response is caused to operate certain mechanism, which in turn carries out the desired agricultural operation. In a machine such as disclosed in my Patent No. 2,400,562, hoeing devices are controlled to carry out plant thinning or weeding operations automatically. In a machine of the type disclosed in my said co-pending application filed simultaneously herewith, the photoelectric unit serves to automatically control such agricultural operations as the selective application of fertilizer, selective application of various liquid sprays to or between the plants, and selective application of insecticidal or fungicidal dusting powder. It will be evident that if such automatic agricultural machines are to operate successfully, the photoelectric unit must be capable of a positive light response with a minimum of false operation due to reflected light from the ground or other objects, and the light response must indicate the position of the plant as accurately as possible, particularly where the plants are relatively small. In addition to the above the photoelectric unit must be relatively immune to various field conditions, such as moisture upon the plants, and the presence of dust.

It is a general object of the present invention to provide a practical photoelectric unit suitable for the various applications outlined above, and which will afford a reliable and relatively accurate light response from plants of a plant row.

An additional object of the invention is to provide a photoelectric unit as described above which will operate under adverse conditions, including the presence of excessive dust, and which can be used on a wide variety of plants in various stages of growth.

Additional objects of the invention will appear from the following description in which the preferred embodiments have been set forth in conjunction with the accompanying drawing.

Referring to the drawing:

Figure 1 is a side elevational view illustrating an agricultural machine suitable for plant thinning operations, and provided with my photoelectric unit.

Figure 2 is an enlarged side elevational view of the photoelectric unit incorporated in Figure 1.

Figure 3 is a side elevational view in section showing the unit of Figure 2.

Figure 4 is a cross-sectional detail taken along the line 4—4 of Figure 3.

Figure 5 is a cross-sectional detail taken along the line 5—5 of Figure 3.

Figure 5A is a fragmentary cross-sectional detail taken similarly to Figure 3 but showing another embodiment of the photoelectric unit.

Figure 5B is a cross-sectional detail taken along the line 5B—5B of Figure 5A.

Figure 6 is diagrammatic plan view illustrating the mode of operation of the machine shown in Figure 1, including operation of the cutters and the relative positioning of the cutters with respect to the photoelectric unit.

Figure 7 is a circuit diagram which illustrates diagrammatically the electrical system for operating various parts of the machine.

Figure 8 is a view similar to Figure 5 but showing another embodiment of the photoelectric unit.

Figure 9 is a cross-sectional detail taken along the line 9—9 of Figure 8.

The complete agricultural machine illustrated in Figure 1 of the drawing consists of a motor driven tractor 10, which is equipped with one or more photoelectric units 11, and one or more sets of hoeing devices 12 capable of plant thinning operations. The photoelectric units 11 are arranged to secure light responses from individual plants of a plant row, and an electrical arrangement is provided whereby when a light response is received by the photoelectric unit, the hoeing device 12 is caused to be energized within a given time interval after receipt of the response, to perform a plant thinning operation.

A preferred form of the photoelectric unit is illustrated in Figures 2 to 5 inclusive. It consists of a box 13 which can be made of metal, and which is provided with a removable top cover 14, and a bottom wall 16 which is made of light transparent material such as a glass plate. This plate can be held in place by the side clamps 15. Within the box 13 there is a lamp 17 to provide a source of light, and a photoelectric tube 18. As will be presently explained it is preferable that the lamp be of the fluorescent gas discharge type, as for example one of the "daylight" type, and the tube 18 may be one of the type commonly available on the market, as for example a photoelectric tube known by manufacturers' specifications as No. P. J. 22. An opaque partition 19 is positioned between lamp 17 and tube 18, and this partition extends down substantially into contact with the inner face of the glass plate 16.

Within the box a metal portion 21 is provided which extends the width of the box, and which defines with the adjacent portion of partition 19, a relatively narrow elongated slot or space 22. Lamp 17 is tubular in form and of sufficient length to extend substantially the entire length of the space 22. Therefore it transmits light throughout the length of slot 22 and through the exposed portion of the glass plate 16. It will be noted that the rays of light from the lamp 17 are directed substantially perpendicular to the surfaces of the glass plate, and as will be presently explained this aids, in conjunction with other features to be presently described, to minimize undesired surface reflection back to the photoelectric tube.

The arrangement for transmitting light to the photoelectric tube 18 employs a relatively flat opaque shroud 23, which can be made of suitable material such as sheet metal and which includes the spaced parallel side walls 24 and 26. The lower edges of the side walls 24 and 26 extend into contact with the inner surface of the plate 16, whereby light is collected from the elongated space 27. Space 27 is coextensive with space 22 and in close side-by-side relationship to the same.

The upper portion of the shroud 23 is convergent or of reduced width (see Figure 4), and is provided with a cylindrical portion 28 which embraces the photoelectric tube 18.

Between the opaque sides 24 and 26 of the shroud there is a lens 29 formed of suitable material such as a transparent plastic, and which has upper and lower arcuately curved edges 31 and 32. This lens serves to collect light received for the full length of space 27, and to direct the same upon the relatively shorter photoelectric tube 18. One or more suitable color filters 33 can be positioned between tube 18 and the lens 29. The particular filter employed depends upon the plants to be operated upon. In general by selecting a proper filter the selectivity of response to a given plant can be increased.

The photoelectric unit described above is adapted to receive a light response from a portion of a plant which is positioned with the region designated generally at 33 in Figure 3. This region is close to plate 16 and relatively narrow as illustrated, but extends for the full length of the slots 22 and 27. It will be noted that the lens 29 is disposed inwardly in a plane at an angle to the general plane of the plate 16, whereby substantially no light reflected back from the inner and outer surfaces of the plate 16 will be received by the photoelectric tube. In this instance the angle mentioned is approximately 45°, whereas the light from the lamp 17 is directed toward the plate 16 substantially at right angles to the same. Thus only a negligible part of the light reflected from the surfaces of the plate 16 is directed upwardly to the photoelectric tube. In other words the angle of the lens with respect to plate 16 is substantially different from the angle of reflection from the inner and outer surfaces of the plate.

The photoelectric unit illustrated in Figures 5A and 5B utilizes the same principles as the photoelectric unit previously described, but differs as to details of construction. In this instance the metal box 34 is provided with a lower metal wall 36, which is provided with a slot 37 occupied by the transparent window or member 38 of glass or like material. Member 38 has one portion 38a which transmits light from the lamp 39, and another portion 38b which extends generally at an angle of 45° to the portion 38a. Portion 38b is enclosed in the lower portion of the opaque shroud 23. Within the shroud and positioned between portion 38b and the photoelectric tube 18, there is a lens 40 corresponding generally to the lens 29 of Figures 2 to 5 inclusive. This lens serves to collect light and to direct the same upon the photoelectric tube.

The means for mounting each of the photoelectric units on the frame of the machine can best be understood by reference to Figures 1 and 2. The mounting means can of course be modified depending upon the number of photoelectric units to be employed. In some instances a single unit may be employed where it is desired to operate upon only one row of plants at a time. In most instances, however, it is desirable to operate upon two adjacent rows of a raised bed simultaneously, and it is feasible to operate simultaneously upon four rows of plants, and possibly more.

In Figure 1 I have shown a frame 41 capable of supporting two photoelectric units and their associated operating means. This frame is normally supported by a ground engaging wheel 42 which is in advance of the photoelectric unit 11, and the frame is attached by sets of links 43 and 44 to the bracket 46. The horizontal shaft 47 to which corresponding ends of the links 43 are attached is also keyed to the operating arm 48. An operating rod 49 is attached to arm 48, and is operated by suitable means such as hydraulic mechanisms to raise or lower the frame 41. This rod is also shown associated with a suitable counterbalancing spring 51, by means of which one may counterbalance or offset a portion of the weight of the frame 41 and its associated parts. Pivotally attached at 52 to frame 41 there is a support member 53, which may be in the form of a channel. Actually two such support members are ordinarily provided, one for each photoelectric unit and associated operating means. However, for simplicity Figure 1 illustrates only one support member 53, and only one photoelectric unit.

The photoelectric unit 11 is embraced by a fork or yoke 54, the lower ends of which are attached by the studs 56 to the retaining clamps 15. The axis of the studs 56 is parallel to and extends midway between the surfaces of the plate 16, and substantially in the plane of the partition 19. This is advantageous because with this arrangement a change in the tilt of the photoelectric unit relative to its supporting means does not affect the timing of the machine. The fork 54 is attached to the lower ends of the spaced parallel depending bars 57, which in turn are attached to the two pairs of links 58 and 59. The upper ends of the bars 57 are slotted at 61 to slidably accommodate the guide rod 62, the latter being attached to the support member 53. The links 58 and 59 are crossed and are pivotally attached to the vertically extending rocker link 64, which in turn has its midpoint pivotally attached to the support bracket 65. With this arrangement the photoelectric unit 11 is free to move in a vertical direction relative to the frame 41 and the support member 53. However, by forming a fixed attachment between the bars 57 and support member 53, the photoelectric unit can be held at a desired elevation.

When operating upon the smaller sized plants the photoelectric unit is generally positioned to move relatively close to the surface of the ground, and in such event its elevation above the ground surface can be conveniently maintained by a small ground engaging runner 66, which is attached to one side of the photoelectric box. For reasons which will be presently explained it is generally desirable to operate the photoelectric unit in such a position that the glass plate 16 is tilted upwardly at its forward edge, and is turned to a position whereby space 22 extends at an angle less than 90° with respect to the axis of the plant row.

In actual operation it may be desirable to attach a counterbalancing spring between the yoke 54 and the support member 53. It will also be noted that a counterbalance spring 67 is attached between the pivoted support member 53, and the structural member 41a of the frame 41. It is also desirable to support the rear end of the support member 53 from a ground engaging member such as the wheel 68 as illustrated. It is desirable that the mounting means for wheels 46 and 48 be made to enable their individual adjustment. Normally wheels 46 and 48 are arranged to maintain member 53 about horizontal and whereby the knives of the hoeing device 12 cut at a desired depth. Counterbalance spring 51 is then adjusted to take most of the weight load off wheels 42 and 68.

The parts controlled by the photoelectric unit 11 include in this instance the hoeing means 12, which are mounted upon the horizontal and longitudinally extending shaft 69. This shaft is journaled at its forward end to a bracket 71 mounted upon support member 53. The other end of shaft 69 extends into a box or housing 72 which is likewise mounted upon the support member 53. A drive shaft 73 extends from the rear end of box 72 in alignment with the shaft 69, and has a drive connection through the universal coupling 74 and extended shaft 76, to a portion of the tractor transmission. Thus shaft 73 is caused to be driven continuously at a rate proportional to the rate of forward movement of the vehicle.

The hoeing means 12 include in this instance the two sets of ground engaging cutters 77 and 78, which are carried by the radially extending arms 79 and 81. These cutters can be formed and may operate substantially as described in my co-pending application Serial No. 707,438, filed November 2, 1946, and entitled "Agricultural Machine and Method." Briefly, and assuming that there are four cutters to each set, the corresponding cutters of each set are staggered and spaced apart. As is likewise disclosed in said co-pending application Serial No. 707,438, a cyclically operating clutch is enclosed within the box 72, and a release solenoid is adapted to be energized to trip the same whereby shaft 73 is clutched to shaft 69. When the cutters are inactive they are in a position such that none of the cutters are dragging in the ground. When the clutch is tripped, the continuously turning shaft 73 is clutched to the shaft 69, and shaft 69 is then turned to an angle of 45°, after which it is stopped. In making this quarter rotation adjacent cooperating cutters pass through the ground surface upon opposite sides of a plant which has produced a light response in the photoelectric unit, thereby eradicating plants for a substantial distance behind and in advance of the plant left standing.

As likewise disclosed in said application Serial No. 707,438, timing means is utilized in the electrical system connecting the photoelectric cell to the clutch release solenoid, and this timing means can be of the type disclosed in my Patent No. 2,437,168. The complete arrangement is illustrated diagrammatically in Figure 7. Briefly it consists of an electronic amplifier 86 having its input attached to the terminals of the photoelectric tube 18. The output of amplifier 86 is coupled to the input of the power amplifier or like power unit 87. The output of amplifier 87 connects with the main winding 88 of the relay 89. This relay is shown provided with two sets of contacts 1, 2 and 3, 4. Contact 1 connects to one terminal of the timer release solenoid 70, the other side of which is connected to ground. Contact 2 connects to a suitable source of current, which in this instance is formed by the condenser 92, one side of which is connected to the contact 2, and the other side of which connects to ground. Condenser 92 is charged from a source of current which is connected to contact 2 through the resistor 93. Relay 89 has a holding coil 94, one side of which is connected to contact 3, the other side of which connects to battery 96 and from thence to one side of the timer switch 97. The other side of the timer switch connects to contact 4.

Another timer switch 98 is connected in series with a circuit 99 for the clutch release solenoid 100 of the clutch 101. Circuit 99 includes the battery or source of current 102. As diagrammatically indicated shaft 73 is shown being driven through gearing 103. From the drive shaft 104 gearing 103 is also shown driving the shaft 106 for the timer 91 at a reduced speed.

As previously stated the timer 91 can be made substantially as illustrated in my Patent No. 2,437,168. As diagrammatically illustrated it includes the wheel 107 which is rotated at a speed proportional to the forward advance of the machine, and which has a plurality of elements 108 frictionally engaging its periphery. These elements may be magnetically retained upon the periphery of the wheel 107 or otherwise retained to have the desired frictional relationship. A plurality of elements 108 are normally retained in single file by the star wheel 109. Upon energizing the solenoid 70, star wheel 109 is released to rotate a fraction of a revolution, sufficient to release one of the elements 108. The released element thereupon travels with the wheel 107, to successively operate the switches 97 and 98.

As described in my said application Serial No. 707,438, it is desirable to render the system substantially immune to daylight or other extraneous sources of light. This is done by supplying the lamp 17 with alternating or pulsating current, and providing amplifiers 86 and 87 which are tuned and are therefore selective to the corresponding frequency of the amplified electrical pulses. For example the lamp 17 may be excited from pulsating current such that the electrical pulses amplified by amplifiers 86 and 87 have a frequency of 230 cycles per second. Selective tuning of the amplifiers to this frequency serves to render the photoelectric unit substantially immune to daylight or extraneous light sources.

Operation of the system diagrammatically illustrated in Figure 7 can be described as follows: Assuming that a light response is received from a plant by the photoelectric tube 18, this response is amplified by the amplifiers 86 and 87 to cause the relay 89 to be energized. Upon closing contacts 1 and 2 the condenser 92 discharges through the solenoid 70 for the timer, thus releasing the star wheel 109 to release one of the elements 108. Contacts 3 and 4 are also closed to establish a holding circuit from battery 96 through the winding 94, thus holding the contacts of the relay closed. When the released element 108 reaches the switch 97, this switch is operated to open the same, thus breaking the circuit for winding 94, and causing the relay contacts to drop open. Within a predetermined time interval after release of the element 108 it reaches and operates the switch 98, and as a result the circuit 99 is closed to operate the clutch release solenoid 100. Operation of solenoid 100 releases the clutch 101, thus causing the cutters 12 to be operated in the manner previously described. Adjusting switch 97 serves to lengthen or shorten the interval after receipt of a response during which the apparatus is inoperative to a succeeding response. Therefore this adjustment serves to determine the minimum spacing of plants left standing in a row.

Figure 6 diagrammatically illustrates in plan a machine consisting of four complete operating units, each operating unit consisting of a photoelectric unit, together with its associated cutters, amplifiers, etc. The plant rows are represented by the lines 111, 112, 113 and 114. As previously explained these rows are customarily (but not necessarily) in raised beds, there being two rows to each bed. The photoelectric units are distributed on the machine to operate above each row of plants, and it will be noted that each unit is turned to such an angle that the zones 33 from which light responses are secured, extend at an angle of less than 90° to the longitudinal center line of a row. The cutters 12 in each instance follow along behind associated photoelectric unit 11, and are arranged to cut through the ground in a direction toward the adjacent furrow. The dotted lines and arrows in each instance represent the approximate direction of cut as the machine advances, and it will be noted that this direction is arranged to be substantially parallel to the direction of extent of the corresponding zones 33. Thus lateral shifting of the machine within certain limits does not affect the accuracy of timing. As previously explained, when a light response is received from a particular photoelectric unit, the response serves to energize the timer and to thus operate the release solenoid for the clutch at a predetermined time interval after the response is received. Thus the cutters are immediately placed in operation to cut through the ground and to eradicate plants which are in front of and behind the plant which caused the light response in the first instance.

The manner in which a plant causes a light response will be dependent somewhat upon the type of plant, and the manner in which the photoelectric unit is adjusted. Where the unit is adjusted to operate upon small plants, with the glass plate 18 relatively close to the ground, the plants are bent over forwardly (see Figure 3) as the glass plate 16 passes over the same, and thus a portion of the bent-over plant near its crown is caused to be positioned within the zone 33, to cause a light response. In many plants this will be the bent-over stem portions of the plants below the main portion of the leaves or foliage. In other instances a portion of the foliage may cause a response. Figure 3 indicates a small plant being bent over underneath the glass plate 16, with a portion of the bent-over plant occupying the zone 33. In the appended claims the light response is recited as being "reflected" light from the plants. It is to be understood however that reflected light may also be received from the plant, and therefore the term "reflected" light is to be inclusive of light resulting from refraction as well as reflection.

It has been found that when the glass plate 16 is caused to pass in wiping contact with the plant, its exposed surface is kept relatively clean of dust or other foreign material, and therefore it is automatically maintained in proper condition to receive a light response from plants. Thus the photoelectric unit is relatively immune to adverse conditions, including conditions of extreme dust.

In some instances it may be desirable to secure a light response from a zone extending a considerable distance below the glass plate 16. To adapt the device for such uses it can be modified as shown in Figures 8 and 9. The lamp 17 in this instance is arranged substantially as shown in Figure 3, so that light rays are directed substantially at right angles to the general plane of the plate 16. However, the shroud 121, corresponding to the shroud 23 of Figure 3, is disposed at an angle more nearly perpendicular to the plane of plate 16. This shroud serves to enclose the lens 122, corresponding to the lens 29 of Figure 3, and lenses 123 and 124. Lenses 123 and 124 aid focusing upon a zone such as indicated generally at 126, which is a substantial distance from the plate 16. Lens 123 has convex cylindrical faces and lens 124 has concavely curved edges. An additional lens 127, which can have convex cylindrical faces, can be used with the lamp 17 to better focus the light rays on zone 126. It will be evident that the form and extent of the zone 126 will depend upon the type of focusing employed.

I claim:

1. In a photoelectric unit for securing a light response from plants and adapted to be moved along a plant row, a box-like enclosure having a window of light transparent material in one wall of the same, a lamp disposed within the enclosure and arranged to transmit light through the window to illuminate a plant exterior of the enclosure, light reflected from the plant being transmitted back through the window, a photoelectric tube disposed within the enclosure and arranged to receive light reflected back through the window from the plant, means for confining the light transmitted from the lamp to a relatively narrow space extending generally laterally of the plant row, and means for confining the reflected light transmitted to the photoelectric tube to a relatively narrow space extending contiguous to and coextensive to said first named space.

2. A photoelectric unit as in claim 1 in which the photoelectric tube is substantially shorter than the length of said spaces, and in which lens means is employed for collecting the reflected light passing back through the window and for directing the collected light upon the photoelectric tube.

3. In a photoelectric unit of the type described, a box-like enclosure having a window of light transparent material forming one wall of the same, a lamp within the enclosure serving to transmit light through said window, whereby a plant exterior of the box is illuminated by said light to reflect light back through the window, a photoelectric tube disposed within the enclosure and arranged to receive light reflected back through the window, light baffling means interposed between the lamp and the photoelectric tube, means forming a relatively narrow space for transmitting light from the lamp to the window, and means forming a relatively narrow space contiguous to said first named space and substantially coextensive with the same for transmitting reflected light to said photoelectric tube, said last named space being defined by an opaque shroud extending from the window to the photoelectric tube, the photoelectric tube being substantially shorter than the length of said space, and lens means disposed within said shroud and serving to collect light from said second named space and to apply the collected light to the photoelectric tube.

4. A photoelectric unit as in claim 3 in which said opaque shroud is disposed at an angle to the surfaces of the window which is substantially different from the angle of reflection of light from said surfaces.

LEO A. MARIHART.

REFERENCES CITED

The following references are of record in the file of this patent:

UNITED STATES PATENTS

| Number | Name | Date |
|---|---|---|
| 1,886,189 | Hough | Nov. 1, 1932 |
| 2,073,800 | Juchter | Apr. 27, 1937 |
| 2,457,113 | Alden | Dec. 28, 1948 |